United States Patent
Yamaguchi

(10) Patent No.: US 10,269,501 B2
(45) Date of Patent: Apr. 23, 2019

(54) SOLID ELECTROLYTIC CAPACITOR, AND PRODUCTION METHOD THEREFOR

(71) Applicant: Panasonic Intellectual Property Management Co., Ltd., Osaka (JP)

(72) Inventor: Nobuyuki Yamaguchi, Saga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/316,827

(22) PCT Filed: Jun. 10, 2015

(86) PCT No.: PCT/JP2015/002902
§ 371 (c)(1),
(2) Date: Dec. 6, 2016

(87) PCT Pub. No.: WO2015/194129
PCT Pub. Date: Dec. 23, 2015

(65) Prior Publication Data
US 2017/0117098 A1   Apr. 27, 2017

(30) Foreign Application Priority Data

Jun. 20, 2014 (JP) .................................. 2014-127308

(51) Int. Cl.
*H01G 9/00* (2006.01)
*H01G 9/15* (2006.01)
(Continued)

(52) U.S. Cl.
CPC ........... *H01G 9/028* (2013.01); *H01G 9/0036* (2013.01); *H01G 9/15* (2013.01); *H01G 13/006* (2013.01)

(58) Field of Classification Search
CPC ......... H01G 9/028; H01G 13/006; H01G 9/00
(Continued)

(56) References Cited

U.S. PATENT DOCUMENTS

2010/0107386 A1   5/2010   Furukawa et al.
2011/0051321 A1*  3/2011   Yamaguchi ............ H01G 9/028
                                                          361/524
(Continued)

FOREIGN PATENT DOCUMENTS

JP   2010-135751   6/2010
JP   2011-049458   3/2011

OTHER PUBLICATIONS

International Search Report of PCT application No. PCT/JP2015/002902 dated Aug. 25, 2015.

*Primary Examiner* — Michael P McFadden
(74) *Attorney, Agent, or Firm* — McDermott Will & Emery LLP

(57) ABSTRACT

Provided is a solid electrolytic capacitor including an anode body, a dielectric layer formed on the anode body, and a solid electrolyte layer that covers at least a part of the dielectric layer and includes a conductive polymer, the solid electrolyte layer including a first silicon-containing component and a second silicon-containing component, the first silicon-containing component being at least one selected from the group consisting of a first silane coupling agent and residues of the first silane coupling agent, the second silicon-containing component being at least one selected from the group consisting of a second silane coupling agent and residues of the second silane coupling agent, the first silane coupling agent including a first substituent that has a first functional group and is bonded with a silicon atom, and a hydrolytically condensable group, the second silane coupling agent including a second substituent that has a second functional group and is bonded with a silicon atom, and a hydrolytically condensable group, and the first substituent and the second substituent being different from each other.

5 Claims, 1 Drawing Sheet

(51) Int. Cl.
*H01G 13/00* (2013.01)
*H01G 9/028* (2006.01)

(58) Field of Classification Search
USPC .......................................... 361/525
See application file for complete search history.

(56) References Cited

U.S. PATENT DOCUMENTS

2011/0052321 A1* 3/2011 Tsai ...................... E02B 11/005
 405/43
2014/0023932 A1* 1/2014 Zhang ............... H01M 10/0564
 429/306

* cited by examiner

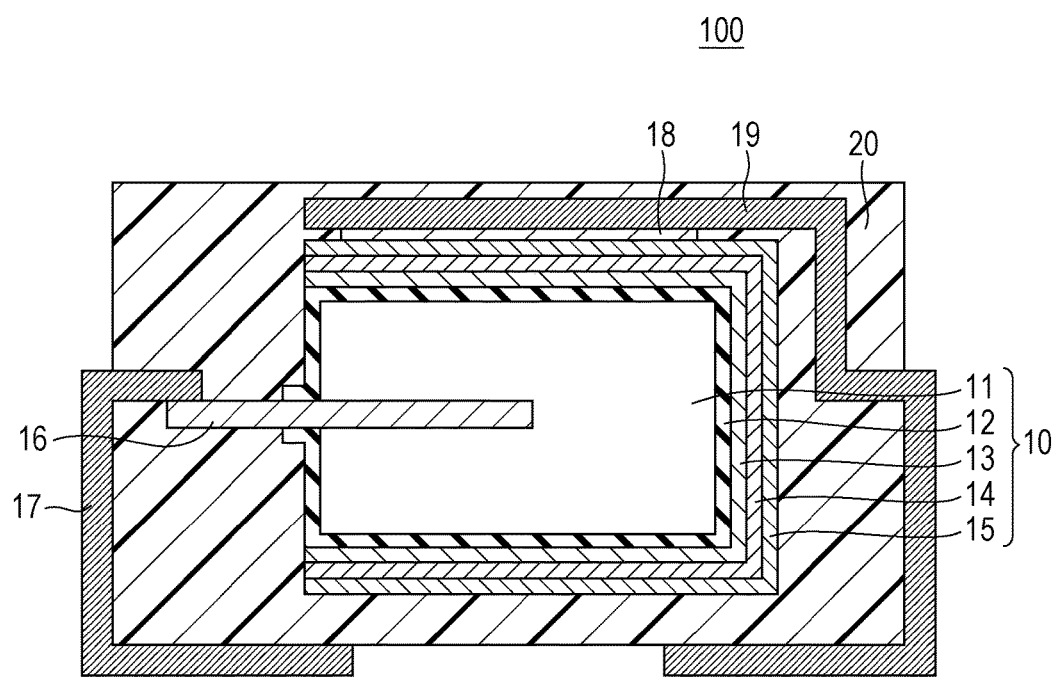

SOLID ELECTROLYTIC CAPACITOR, AND PRODUCTION METHOD THEREFOR

CROSS-REFERENCE TO RELATED APPLICATIONS

This application is a U.S. national stage application of the PCT International Application No. PCT/JP2015/002902 filed on Jun. 10, 2015, which claims the benefit of foreign priority of Japanese patent application No. 2014-127308 filed on Jun. 20, 2014, the contents all of which are incorporated herein by reference.

TECHNICAL FIELD

The present invention relates to a solid electrolytic capacitor and a production method for the solid electrolytic capacitor.

BACKGROUND ART

With the advent of downsized and high frequency electronic devices in recent years, downsizing and a high frequency are also required of electronic components, i.e. capacitors, which constitute electronic devices. As a capacitor suitable for downsizing, there is a solid electrolytic capacitor in which a dielectric film is formed on an anode body made of a valve metal, and a conductive polymer-containing solid electrolyte layer is formed on the dielectric film.

The solid electrolytic capacitor as described above, however, is likely to generate leakage current (LC) while enabling downsizing.

In order to reduce generation of leakage current, PTL 1 proposes to add a silane coupling agent into a solid electrolyte layer.

CITATION LIST

Patent Literature

PTL 1: Unexamined Japanese Patent Publication No. 2011-49458

SUMMARY OF THE INVENTION

Technical Problem

However, further improvement is desired to reduce the generation of leakage current of the solid electrolytic capacitor.

An object of the present invention is to provide a solid electrolytic capacitor in which leakage current is that suppressed, and a production method for the solid electrolytic capacitor.

Solutions to Problem

An aspect of the present invention relates to a solid electrolytic capacitor including an anode body, a dielectric layer formed on the anode body, and a solid electrolyte layer that covers at least a part of the dielectric layer and includes a conductive polymer, the solid electrolyte layer including a first silicon-containing component and a second silicon-containing component, the first silicon-containing component being at least one selected from the group consisting of a first silane coupling agent and residues of the first silane coupling agent, the second silicon-containing component being at least one selected from the group consisting of a second silane coupling agent and residues of the second silane coupling agent, the first silane coupling agent including a first substituent that has a first functional group and is bonded with a silicon atom, and a hydrolytically condensable group, the second silane coupling agent including a second substituent that has a second functional group and is bonded with a silicon atom, and a hydrolytically condensable group, and the first substituent and the second substituent being different from each other.

Another aspect of the present invention relates to a method for producing a solid electrolytic capacitor, the method including: a first step of preparing an anode body on which a dielectric layer is formed; a second step of forming a first solid electrolyte layer that covers at least a part of the dielectric layer by a first treatment solution containing a conductive polymer or a raw material of a conductive polymer, and a first coupling agent; and a third step of forming a second solid electrolyte layer that covers at least a part of the first solid electrolyte layer by a second treatment solution containing a conductive polymer or a raw material of a conductive polymer, and a second coupling agent, the first silane coupling agent including a first substituent that has a first functional group and is bonded with a silicon atom, and a hydrolytically condensable group, the second silane coupling agent including a second substituent that has a second functional group and is bonded with a silicon atom, and a hydrolytically condensable group, and the first substituent and the second substituent being different from each other.

Further another aspect of the present invention relates to a method for producing a solid electrolytic capacitor, the method including: a first step of preparing an anode body on which a dielectric layer is formed; and a second step of forming a solid electrolyte layer that covers at least a part of the dielectric layer by a treatment solution containing a conductive polymer or a raw material of a conductive polymer, a first silane coupling agent, and a second coupling agent, the first silane coupling agent including a first substituent that has a first functional group and is bonded with a silicon atom, and a hydrolytically condensable group, the second silane coupling agent including a second substituent that has a second functional group and is bonded with a silicon atom, and a hydrolytically condensable group, and the first substituent and the second substituent being different from each other.

Advantageous Effect of Invention

According to the present invention, there can be provided a solid electrolytic capacitor in which leakage current is suppressed.

BRIEF DESCRIPTION OF DRAWING

FIG. 1 is a schematic sectional view showing a structure of a solid electrolytic capacitor according to an exemplary embodiment of the present invention.

DESCRIPTION OF EMBODIMENT

A solid electrolytic capacitor of the present invention includes an anode body, a dielectric layer formed on the anode body, and a solid electrolyte layer that covers at least a part of the dielectric layer and includes a conductive polymer. The solid electrolyte layer includes a first silicon-containing component and a second silicon-containing component. The first silicon-containing component is at least one selected from the group consisting of a first silane coupling agent and residues of the first silane coupling agent. The second silicon-containing component is at least one selected from the group consisting of a second silane coupling agent and residues of the second silane coupling agent.

Next, a first production method for a solid electrolytic capacitor of the present invention includes: (i) a first step of preparing an anode body on which a dielectric layer is formed; (ii) a second step of forming a first solid electrolyte layer that covers at least a part of the dielectric layer by a first treatment solution containing a conductive polymer or a raw material of a conductive polymer, and a first coupling agent; and (iii) a third step of forming a second solid electrolyte layer that covers at least a part of the first solid electrolyte layer by a second treatment solution containing a conductive polymer or a raw material of a conductive polymer, and a second coupling agent.

A second production method for a solid electrolytic capacitor of the present invention includes: (i) a first step of preparing an anode body on which a dielectric layer is formed; and (ii) a second step of forming a solid electrolyte layer that covers at least a part of the dielectric layer by a treatment solution containing a conductive polymer or a raw material of a conductive polymer, a first silane coupling agent, and a second coupling agent.

The first silane coupling agent includes a first substituent that has a first functional group and is bonded with a silicon atom, and a hydrolytically condensable group. The second silane coupling agent includes a second substituent that has a second functional group and is bonded with a silicon atom, and a hydrolytically condensable group. The second substituent, however, is different from the first substituent.

On the other hand, the hydrolytically condensable group of the first silane coupling agent (first hydrolytically condensable group) and the hydrolytically condensable group of the second silane coupling agent (second hydrolytically condensable group) may be the same or different from each other.

The residues of the first and second silane coupling agents are formed by a reaction of the functional group and/or the hydrolytically condensable group included in the silane coupling agents. The reaction of the functional group and/or the hydrolytically condensable group may be, for example, a reaction of the functional group and/or the hydrolytically condensable group with a constituent of the dielectric layer or a constituent of the solid electrolyte layer.

In the first and second silane coupling agents, a total number of substituents and hydrolytically condensable groups is from 3 to 4. For example, one of these substituents and groups is a substituent, and others are hydrolytically condensable groups. The substituent, however, is not limited to one, and the hydrolytically condensable group is not also limited to any certain number of groups. When the first and second silane coupling agents include a plurality of hydrolytically condensable groups, the plurality of hydrolytically condensable groups are independent from one another, and may be the same or different from one another.

The silane coupling agent has a type of cross-linking action by chemical bonding with a substance and/or expression of affinity force for a substance. Therefore, it is considered that in the solid electrolyte layer including a silicon-containing component derived from the silane coupling agent, bonding force or affinity between conductive polymer chains is strengthened to suppress leakage current. Under the circumstances, the solid electrolyte layer includes silicon-containing components derived from at least two silane coupling agents, i.e. the first silicon-containing component and the second silicon-containing component to improve an effect of suppressing the leakage current.

While it is not clear why the effect of suppressing the leakage current is improved, it is considered that the bonding force or the affinity between conductive polymer chains is further enhanced. Specifically, it is considered that there are, in the solid electrolyte layer, a plurality of types of sites acted on by the silane coupling agent. Such sites each have different reactivity and affinity for the silane coupling agent. It is also considered that a cross-linking action and an effect of suppressing the leakage current by the cross-linking action are different according to a type of the silane coupling agent. It is assumed that use of at least two silane coupling agents gives a plurality of types of cross-linking actions and effects to increase the effect of suppressing the leakage current.

The solid electrolyte layer including the first silicon-containing component and the second silicon-containing component not only suppresses the leakage current but also improves withstand voltage characteristics in many cases.

Generally, it is necessary to increase an amount of use of a silicon containing-component for enhancement of withstand voltage characteristics and heat resistance characteristics. Increase of a silicon-containing component, however, is likely to raise equivalent series resistance (ESR). On the other hand, use of two or more silicon-containing components in combination can effectively give high withstand voltage characteristics and high heat resistance characteristics by a relatively small amount of the silicon-containing components.

It is preferable that one of the first functional group and the second functional group have active hydrogen and another do not have active hydrogen. Thereby, it is likely to be advantageous for improvement of bonding force between the dielectric layer and the solid electrolyte layer and improvement of electrical conductivity of the solid electrolyte layer. Here, the active hydrogen means hydrogen that is likely to desorb as a proton, and hydrogen of a thiol group (—SH) and hydrogen of a secondary amine (RNHR') are classified into the active hydrogen. Further, the first substituent and the second substituent preferably have a different electron withdrawing property or electron donating property. These conditions are preferable because presence or absence of active hydrogen in the functional group and/or a degree of the electron withdrawing property or the electron donating property affect reactivity of the silane coupling agent and affinity between the silane coupling agent and the conductive polymer. For example, increase in the electron withdrawing property of the substituent accelerates a rate of hydrolysis of the hydrolytically condensable group so that the reactivity of the silane coupling agent is likely to be enhanced. An electron donatable substituent is considered to be small in the electron withdrawing property so that a relative magnitude correlation is always established in the electron withdrawing property.

When the first functional group does not have active hydrogen and the second functional group has active hydrogen, much of the first silane coupling agent in the solid electrolyte layer is preferably distributed nearer the dielectric layer than the second silane coupling agent. The first silane coupling agent is considered to have a large effect of improving the withstand voltage characteristics while suppressing deterioration of the electrical conductivity. On the other hand, much of the second silane coupling agent is preferably distributed farther from the dielectric layer than the first silane coupling agent. Although the second silane coupling agent excessively distributed near the dielectric layer may deteriorate the electrical conductivity, the second silane coupling agent is considered to be excellent in restorability of the dielectric layer and improve the withstand voltage characteristics.

Further, when the first functional group does not have active hydrogen and the second functional group has active hydrogen, the first silane coupling agent is preferably included more than the second silane coupling agent in the solid electrolyte layer. Thereby, the solid electrolyte layer is considered to easily give the effect of improving the withstand voltage characteristics while suppressing the deterioration of the electrical conductivity.

The solid electrolyte layer may include a first solid electrolyte layer that covers at least a part of the dielectric layer, and a second solid electrolyte layer that covers at least a part of the first solid electrolyte layer. In this case, the first solid electrolyte layer may include the first silicon-containing component, and the second solid electrolyte layer may include the second silicon-containing component. In this case, cross-linking actions by mutually different silane coupling agents and effects of suppressing the leakage current by the actions can be obtained in the first solid electrolyte layer and the second solid electrolyte layer, respectively. Accordingly, the first solid electrolyte layer and the second solid electrolyte layer are considered to come to compensate their effects with each other, so that the effects of suppressing the leakage current, improving the withstand voltage characteristics, and ESR are enhanced.

In the solid electrolyte layer, a concentration of the first silicon-containing component is preferably higher than a concentration of the second silicon-containing component. Further, in the treatment solution used in the second production method described above, a concentration of the first silane coupling agent is preferably higher than a concentration of the second silane coupling agent. Thereby, the leakage current is easily suppressed while the electrical conductivity is maintained high and the ESR low in the solid electrolyte layer.

A concentration of the first silicon-containing component in the first solid electrolyte layer is preferably higher than a concentration of the second silicon-containing component in the second solid electrolyte layer. Further, a concentration of the first silane coupling agent in the first treatment solution used in the first production method described above is preferably higher than a concentration of the second silane coupling agent in the second treatment solution. Thereby, the leakage current is easily suppressed while the electrical conductivity is maintained high and the ESR low in the solid electrolyte layer, as with the case described above.

In the solid electrolytic capacitor described above, the anode body is preferably a sintered body of a valve action metal or a valve action metal foil whose surface is roughened, for example.

Hereinafter, an exemplary embodiment of the present invention will be described with reference to the drawing. In the drawing below, the same numerical reference is applied to the same part or a corresponding part, and the description for the part is not repeated. A dimension relationship of length, a size and width in the drawing is appropriately changed for clarification and simplification of the drawing, and the drawing does not indicate actual dimensions.

<Structure of Solid Electrolytic Capacitor>

FIG. 1 is a sectional view schematically showing a structure of a solid electrolytic capacitor according to the present exemplary embodiment. In FIG. 1, solid electrolytic capacitor 100 includes capacitor element 10 having anode body 11 on a surface of which dielectric layer 12 is formed, solid electrolyte layer 13 formed on dielectric layer 12, carbon layer 14, as a cathode lead-out layer, formed on solid electrolyte layer 13, and silver paste layer 15.

Solid electrolytic capacitor 100 further includes anode lead 16, anode terminal 17, adhesive layer 18, and cathode terminal 19. Anode lead 16 is a bar-shaped body made of a valve action metal (e.g. tantalum, niobium, titanium, and aluminum), one end of the anode lead is embedded in anode body 11, and another end is disposed so as to protrude to an outside of capacitor element 10. A part of anode terminal 17 is connected to anode lead 16 by welding. Cathode terminal 19 is disposed so as to be connected to an outermost layer of capacitor element 10, or silver paste layer 15 with adhesive layer 18 made of an electrically conductive adhesive interposed between the cathode terminal and the silver paste layer.

Solid electrolytic capacitor 100 further includes outer resin 20. Outer resin 20 seals capacitor element 10, in which are disposed anode lead 16, anode terminal 17, adhesive layer 18, and cathode terminal 19, in such a manner that a part of anode terminal 17 and a part of cathode terminal 19 are exposed from outer resin 20.

In solid electrolytic capacitor 100, anode body 11 is a sintered body of a valve action metal (e.g. tantalum, niobium, titanium, and aluminum). Dielectric layer 12 is an oxide film formed by a chemical conversion treatment of the sintered body. For example, when tantalum (Ta) is used as the valve action metal, composition of dielectric layer 12 becomes $Ta_2O_5$. When aluminum (Al) is used as the valve action metal, composition of dielectric layer 12 becomes $Al_2O_3$. The sintered body has a porous structure.

Solid electrolyte layer 13 includes a conductive polymer, a first silicon-containing component, and a second silicon-containing component. The first silicon-containing component is at least one selected from the group consisting of a first silane coupling agent and residues of the first silane coupling agent. The second silicon-containing component is at least one selected from the group consisting of a second silane coupling agent and residues of the second silane coupling agent.

The silane coupling agents can chemically bond with an inorganic substance through a hydrolysis and dehydration reaction of a hydrolytically condensable group. Accordingly, the silane coupling agents have an action of restoring or protecting a defective part of the dielectric layer. Such an action is effective for suppression of leakage current to some extent. Further, solid electrolyte layer 13 includes the first silicon-containing component and the second silicon-containing component that each have a different functional group, to further enhance the effect of suppressing the leakage current.

Solid electrolyte layer 13 including the first silicon-containing component and the second silicon-containing component may have a single-layered structure or a two or more-layered structure. In the case of the two or more-layered structure, a concentration of the first silicon-containing component and/or the second silicon-containing component may be changed in each layer. For example, the farther the layer is from dielectric layer 12, the lower the concentration of the first silicon-containing component and/or the second silicon-containing component is. Further, when solid electrolyte layer 13 has the two or more-layered structure, a layer on a near side of dielectric layer 12 may include no second silicon-containing component but include the first silicon-containing component, while a layer on a farther side from dielectric layer 12 may include no first silicon-containing component but include the second silicon-containing component.

In the meantime, it is also considered to be possible to enhance the effect of suppressing the leakage current by singularly including the first silicon-containing component or the second silicon-containing component in solid electrolyte layer 13 to increase the concentration of the component. However, when the concentration of the silicon-containing component becomes high, ESR is likely to increase generally. This is considered to be because the silicon-containing component is an insulating body. On the other hand, solid electrolyte layer 13 including the first silicon-containing component and the second silicon-containing component can enhance the effect of suppressing the leakage current without having a so high concentration of the silicon-containing component, while also suppressing the increase in the ESR.

In FIG. 1, carbon layer 14 as a cathode lead-out layer should have electrical conductivity, and the carbon layer can be formed of graphite, for example. Anode terminal 17 and cathode terminal 19 can be formed of a metal such as copper or a copper alloy. As a material of outer resin 20, for example, an epoxy resin can be used.

Next, the first and second silane coupling agents will be described in more detail taking as an example a case in which the first functional group does not have active hydrogen and the second functional group has active hydrogen.

[Hydrolytically Condensable Group of First and Second Silane Coupling Agents]

The hydrolytically condensable group included in the first and second silane coupling agents is preferably an alkoxy group or a halogen group, for example. As the alkoxy group, a methoxy group, an ethoxy group, a n-propoxy group, an isopropoxy group, and the like are preferable. As the halogen group, a chlorine group is preferable. When the silane coupling agents include a plurality of hydrolytically condensable groups in one molecule, the plurality of hydrolytically condensable groups may be the same or different from one another.

[First Substituent of First Silane Coupling Agent]

The first substituent includes a first functional group, and may further include a first organic linking group that links the first functional group to a silicon atom.

An example of the first functional group includes at least one selected from the group consisting of an epoxy group, an ethylene sulfide group, an acrylic group (or an acryloxy group), a methacrylic group (or a methacryloxy group), and a vinyl group. Among these groups, the epoxy group is particularly preferable. The epoxy group includes an alicyclic epoxy group (e.g. an epoxy cyclopentyl group, an epoxy cyclohexyl group, and an epoxy cycloheptyl group).

As the first organic linking group, an alkylene group, an oxyalkylene group, and the like are preferable, and particularly, an ethylene group, an oxyethylene group, a propylene group, an oxypropylene group, a butylene group, an oxybutylene group, and the like are preferable.

Specifically, the first substituent is preferably a glycidyl group, a glycidoxyalkyl group (e.g. a glycidoxypropyl group), an alicyclic epoxyalkyl group (e.g. an (epoxycyclohexyl) ethyl group), an acryloxyalkyl group, and a methacryloxyalkyl group, for example.

Examples of the first silane coupling agent include vinyl trichlorosilane, vinyl (β-methoxysilane), vinyltrimethoxysilane, vinyltriethoxysilane, γ-glycidoxypropyltrimethoxysilane, γ-glycidoxypropylmethyldiethoxysilane, β-(3,4-epoxycyclohexyl)ethyltrimethoxysilane, γ-methacryloxypropyltrimethoxysilane, and γ-methacryloxypropylmethyldiethoxysilane. These agents may be used singularly, or two or more of these agents may be used in combination.

[Second Substituent of Second Silane Coupling Agent]

The second substituent includes a second functional group, and may further include a second organic linking group that links the second functional group to a silicon atom.

An example of the second functional group includes at least one selected from the group consisting of an amino group and a mercapto group. Among these groups, the mercapto group is particularly preferable.

As the second organic linking group, an alkylene group, an oxyalkylene group, and the like are preferable, and particularly, an ethylene group, an oxyethylene group, a propylene group, an oxypropylene group, a butylene group, an oxybutylene group, and the like are preferable.

Specifically, the second substituent is preferably a mercaptoalkyl group (e.g. a mercaptopropyl group) and an aminoalkyl group (e.g. an aminopropyl group), for example.

Examples of the second silane coupling agent include N-β-(aminoethyl)-γ-aminopropylmethyldimethoxysilane, N-β-(aminoethyl)-γ-aminopropyltrimethoxysilane, γ-aminopropyltriethoxysilane, N-phenyl-γ-aminopropyltrimethoxysilane, γ-mercaptopropyltrimethoxysilane, γ-mercaptopropylmethyldimethoxysilane, and γ-chloropropyltrimethoxysilane. These agents may be used singularly, or two or more of these agents may be used in combination.

Next, as the conductive polymer that constitutes solid electrolyte layer 13, a polymer is preferable, which includes at least one selected from the group consisting of an aliphatic compound, an aromatic compound, a heterocyclic compound, and a heteroatom-containing compound. More specifically, as the conductive polymer, there can be used, for example, polypyrrole, polythiophene, polyfuran, polyaniline, polyacetylene, polyphenylene, polyphenylene vinylene, polyacene, polythiophenevinylene, and derivatives of these substances. These conductive polymers may be used singularly, two or more of these conductive polymers may be used in combination, or a copolymer of two or more monomers may also be used.

The conductive polymer may include a dopant. As the dopant, there can be used, for example, an alkyl sulfonic acid, an aromatic sulfonic acid, and a polycyclic aromatic sulfonic acid. Specifically, there is used, for example, 1-octane sulfonic acid, benzenesulfonic acid, p-toluenesulfonic acid, polystyrene sulfonic acid, and naphthalenedisulfonic acid.

<Production Method for Solid Electrolytic Capacitor>

Next, a production method for solid electrolytic capacitor 100 will be described.

First, a valve action metal powder is prepared. The metal powder is molded into a prescribed shape to form a compact, with one end side in a longitudinal direction of anode lead 16 being a bar-shaped body embedded in the metal powder. Sintering of the compact gives anode body 11 having a porous structure, with one end of anode lead 16 embedded in the anode body.

Next, a chemical conversion treatment is performed on anode body 11 to form dielectric layer 12 on a surface of anode body 11. For example, anode body 11 is immersed in a chemical conversion solution such as an aqueous phosphoric acid solution, and a voltage is applied between anode body 11 as an anode and a cathode in the chemical conversion solution. Thereby, the chemical conversion treatment proceeds.

Next, anode body 11 on which dielectric layer 12 has been formed is immersed in a first treatment solution to impregnate, with the first treatment solution, up to the surface of anode body 11 on which the dielectric layer has been formed (the surface including inner wall surfaces of pores of a porous body on which the dielectric layer has been formed). For example, the first treatment solution contains a precursor monomer as a raw material of a first conductive polymer, an oxidizing agent having a dopant function, and the first silane coupling agent in which the first functional group does not have active hydrogen. Then, a monomer in the first treatment solution, with which anode body 11 has been impregnated, is polymerized to form on dielectric layer 12 first solid electrolyte layer 13A including the first conductive polymer.

A content (concentration C1) of the first silane coupling agent contained in the first treatment solution should be, for example, from 1 part by mass to 15 parts by mass per 100 parts by mass of a substance except the first silane coupling agent in the first treatment solution.

Next, anode body 11 on which first solid electrolyte A has been formed is immersed in a second treatment solution to impregnate, with the second treatment solution, up to the surface of anode body 11 on which first solid electrolyte layer A has been formed (the surface including the inner wall surfaces of the pores of the porous body on which first solid electrolyte layer A has been formed). For example, the second treatment solution contains a precursor monomer as a raw material of a second conductive polymer, an oxidizing agent having a dopant function, and the second silane coupling agent in which the second functional group has active hydrogen. Then, a monomer in the second treatment solution, with which anode body 11 has been impregnated, is polymerized to form on first solid electrolyte layer A second solid electrolyte layer B including the second conductive polymer.

A content (concentration C2) of the second silane coupling agent contained in the second treatment solution should be, for example, from 0.1 parts by mass to 5 parts by mass per 100 parts by mass of a substance except the second silane coupling agent in the second treatment solution.

The concentrations C2 and C1 may be the same, but the concentration C2 is preferably lower than the concentration C1. Thereby, the first silicon-containing component can be included more in first solid electrolyte layer A, and the second silicon-containing component can be included less in second solid electrolyte layer B. This constitution increases the effect of improving the withstand voltage characteristics while suppressing the deterioration of the electrical conductivity. Accordingly, a solid electrolytic capacitor is easily obtained, in which the leakage current is suppressed and which is excellent in balance between the withstand voltage characteristics and the ESR.

In the exemplary embodiment described above, a case has been described in which first solid electrolyte layer A and second solid electrolyte layer B are formed by chemical polymerization; however, the formation is not limited to the chemical polymerization. For example, second solid electrolyte layer B may be formed by electropolymerization. In the case of the electropolymerization, anode body 11 including dielectric layer 12 is immersed in a polymerization solution (second treatment solution) containing a silane coupling agent and a precursor monomer, followed by application of a current or a voltage, to form second solid electrolyte layer B.

Alternatively, in the chemical polymerization, anode body 11 including dielectric layer 12 may be immersed in a treatment solution containing a silane coupling agent and a precursor monomer, followed by separate immersion in a solution containing an oxidizing agent. Contrariwise, anode body 11 including dielectric layer 12 may be immersed in a solution containing an oxidizing agent, followed by immersion in a treatment solution containing a silane coupling agent and a precursor monomer.

Further, at least one of first solid electrolyte layer A and second solid electrolyte layer B may be formed by a solution containing a conductive polymer dissolved therein (polymer solution) or a dispersion liquid containing a conductive polymer dispersed therein (polymer dispersion liquid). For example, the anode body may be immersed in the first treatment solution obtained by adding the first silane coupling agent to the polymer solution or the polymer dispersion liquid, picked up from the solution, and dried to form first solid electrolyte layer A. In the same manner, the anode body may be immersed in the second treatment solution obtained by adding the second silane coupling agent to the polymer solution or the polymer dispersion liquid, picked up from the solution, and dried to form second solid electrolyte layer B.

Further, first solid electrolyte layer A may be formed by the chemical polymerization, and second solid electrolyte layer B may be formed by the polymer solution or the polymer dispersion liquid. In this case, first solid electrolyte layer A may be formed by the polymerization solution (first treatment solution) containing the silane coupling agent and the precursor monomer, and second solid electrolyte layer B may be formed by the second treatment solution obtained by adding the second silane coupling agent to the polymer solution or the polymer dispersion liquid.

In the meantime, one treatment solution may be used, which contains the first silane coupling agent and the second silane coupling agent in mixture. For example, the treatment solution may contain the precursor monomer as a raw material of a conductive polymer, the oxidizing agent having a dopant function, the first silane coupling agent in which the first functional group does not have active hydrogen, and the second silane coupling agent in which the second functional group has active hydrogen. In this case, anode body 11 on which dielectric layer 12 is formed can be immersed in the treatment solution, followed by polymerization of a monomer in the treatment solution with which anode body 11 has been impregnated, to form solid electrolyte layer including the first silicon-containing component and the second silicon-containing component.

A content (concentration C1') of the first silane coupling agent contained in the treatment solution should be, for example, from 1 part by mass to 20 parts by mass per 100 parts by mass of a substance except the first and second silane coupling agents in the treatment solution. Further, a content (concentration C2') of the second silane coupling agent contained in the treatment solution should be, for example, from 0.1 parts by mass to 5 parts by mass per 100 parts by mass of a substance except the first and second silane coupling agents in the treatment solution.

The concentrations C2' and C1' may be the same, but the concentration C2' is preferably lower than the concentration C1'. Thereby, the first silicon-containing component can be included more than the second silicon-containing component in solid electrolyte layer 13. This constitution increases the effect of improving the withstand voltage characteristics while suppressing the deterioration of the electrical conductivity. Accordingly, a solid electrolytic capacitor is easily obtained, in which the leakage current is suppressed and which is excellent in balance between the withstand voltage characteristics and the ESR.

Also here, solid electrolyte layer 13 may be formed by the polymer solution or the polymer dispersion liquid. For example, the anode body is immersed in the treatment solution obtained by adding the first and second silane coupling agents to the polymer solution or the polymer dispersion liquid, picked up from the solution, and dried to form the solid electrolyte layer.

In the case of forming a solid electrolyte layer having a two or more-layered structure, the operations described above should be repeated a plurality of times. In the repeated operations, the concentration of the first silane coupling agent and/or the second coupling agent contained in the treatment solution may be changed. For example, the concentration of the first silane coupling agent and/or the second silane coupling agent may be changed so that the farther the layer is from dielectric layer 12, the lower the concentration of the first silicon-containing component and/or the second silicon-containing component is.

The precursor monomer, a type of the oxidizing agent and a type of a solvent that are used to form each layer should be selected independently according to the layer. The precursor monomer does not need to be necessarily a monomer, and the general idea of the precursor monomer includes a low-molecular-weight oligomer. The oxidizing agent may have a function as a dopant.

Then, on anode body 11 is disposed carbon layer 14, silver paste layer 15, anode terminal 17, adhesive layer 18, and cathode terminal 19. Lastly, the elements are sealed by outer resin 20 so that solid electrolytic capacitor 100 is produced.

In the present invention, the solid electrolytic capacitor is not limited to the solid electrolytic capacitors having the structures described above, and the present invention can be applied to electrolytic capacitors having various structures. Specifically, the present invention can be applied to, for example, a wound solid electrolytic capacitor and a laminated solid electrolytic capacitor including a valve metal plate.

EXAMPLES

Hereinafter, the present invention will be more specifically described with reference to examples. The present invention, however, is not limited to the examples below.

Examples 1 to 3 and Comparative Examples 1 to 5

A tantalum powder was prepared, and was molded into a rectangular parallelepiped with one end side in a longitudinal direction of anode lead 16 being a bar-shaped body embedded in a metal powder. Then, the molded body was sintered to prepare anode body 11 in which one end of anode lead 16 was embedded. Next, anode body 11 was immersed in a phosphoric acid solution having a concentration of 0.02% by mass, followed by application of a voltage of 100 V, to form dielectric layer 12 made of $Ta_2O_5$ on a surface of anode body 11.

Next, a first treatment solution (polymerization solution) was prepared by mixing 1-butanol with 3,4-ethylenedioxythiophene as a precursor monomer, a first silane coupling agent, and p-toluenesulfonic acid iron(III) as an oxidizing agent having a dopant function. The first treatment solution was prepared so that the mass ratio of the compounds became 3,4-ethylenedioxythiophene:first silane coupling agent:p-toluenesulfonic acid iron(III):1-butanol=1:0.9:5:11.5.

Anode body 11 on which dielectric layer 12 had been formed was immersed in the first treatment solution for 1 minute. Then, anode body 11 was picked up from the first treatment solution and was subjected to a heat treatment to form first solid electrolyte layer A.

After the formation of the first solid electrolyte layer, second solid electrolyte layer B was formed by a second treatment solution containing a second silane coupling agent in place of the first silane coupling agent in the same method as in the formation of first solid electrolyte layer A. In Comparative Examples 1 to 3, however, second solid electrolyte layer B was formed by the second treatment solution not containing the second silane coupling agent.

Table 1 shows types of the first and second silane coupling agents used in the first and second treatment solutions, and a mass ratio between a content (C1) of the first silane coupling agent in the first treatment solution and a content (C2) of the second silane coupling agent in the second treatment solution.

Carbon layer 14 was formed by applying a suspension of graphite particles to the dried anode body and drying the anode body in atmosphere, and further, silver paste layer 15, anode terminal 17, adhesive layer 18, and cathode terminal 19 were disposed, followed by sealing the elements with an outer resin, to produce a solid electrolytic capacitor.

Examples 4 to 7 and Comparative Examples 6 to 10

A treatment solution (third treatment solution) was prepared by mixing 1-butanol with 3,4-ethylenedioxythiophene as a precursor monomer, a first silane coupling agent, a second silane coupling agent, and p-toluenesulfonic acid iron(III) as an oxidizing agent having a dopant function. The third treatment solution was prepared so that the mass ratio of the compounds became 3,4-ethylenedioxythiophene:total of first silane coupling agent and second silane coupling agent:p-toluenesulfonic acid iron(III):1-butanol=1:0.9:5:11.5.

Anode body 11 including dielectric layer 12, which was prepared in the same method as in the examples of the first exemplary embodiment, was immersed in the third treatment solution for 1 minute. Then, anode body 11 was picked up from the first treatment solution and subjected to a heat treatment. Further, the operation of immersing anode body 11 in the third treatment solution and subjecting the anode body to the heat treatment was repeated in the same manner to form a solid electrolyte layer. Then, a solid electrolytic capacitor was completed in the same method as in Example 1.

Table 2 shows types of the first and second silane coupling agents used in the third treatment solution, and a mass ratio between a content (C1') of the first silane coupling agent and a content (C2') of the second silane coupling agent in the third treatment solution.

In the third treatment solution used in Comparative Examples 6, 8, and 10, only the first silane coupling agent shown in Table 2 was mixed, and the second silane coupling agent was not used.

<Performance Evaluation>
<<Withstand Voltage>>

A withstand voltage (V) was measured for the solid electrolytic capacitor of each of Examples and Comparative Examples. Specifically, 120 solid electrolytic capacitors were randomly selected in each of Examples and Comparative Examples, and each of the solid electrolytic capacitors was subjected to measurement of a break-down voltage (BDV) at which a 1 A overcurrent flowed, by applying a voltage to the solid electrolytic capacitor while raising the voltage at a rate of 1.0 V/sec. Results are shown in Tables 1 and 2.

<<LC Nondefective Rate>>

An LC nondefective rate (%) was measured for the solid electrolytic capacitor of each of Examples and Comparative Examples. The term "LC nondefective rate" is an index indicating a degree of leakage current of a solid electrolytic capacitor. Specifically, 120 solid electrolytic capacitors were randomly selected in each of Examples and Comparative Examples, and each of the solid electrolytic capacitors was connected to a resistor of 1 kΩ in series, and the leakage current was measured after application of a rated voltage of 25 V for 1 minute by a DC power source. Then, a solid electrolytic capacitor having a leakage current amount of 37.5 μA or less was determined to be nondefective, and the LC nondefective rate was calculated for each of Examples and Comparative Examples. Results are shown in Tables 1 and 2.

TABLE 1

|  | First silane coupling agent | Second silane coupling agent | C1:C2 | LC non-Defective raten (%) | BDV (V) |
| --- | --- | --- | --- | --- | --- |
| Example 1 | 3-Glycidoxypropyl-trimethoxysilane | 3-Mercapto-Propyltrimethoxysilane | 1:1 | 98 | 60 |
| Example 2 | 3-Glycidoxypropyl-trimethoxysilane | 2-(3,4-Epoxycyclohexyl)ethyltrimethoxysilane | 1:1 | 94 | 55 |
| Example 3 | 3-Mercaptopropyl-trimethoxysilane | 2-(3,4-Epoxycyclohexyl)ethyltrimethoxysilane | 1:1 | 96 | 58 |
| Comparative Example 1 | 3-Glycidoxypropyl-trimethoxysilane | — | — | 60 | 40 |
| Comparative Example 2 | 3-Mercaptopropyl-trimethoxysilane | — | — | 90 | 50 |
| Comparative Example 3 | 2-(3,4-Epoxycyclohexyl)-ethyltrimethoxysilane | — | — | 4 | 30 |
| Comparative Example 4 | 3-Glycidoxypropyl-trimethoxysilane | 3-Glycidoxypropyl-triethoxysilane | 1:1 | 65 | 42 |
| Comparative Example 5 | 3-Mercaptopropyl-trimethoxysilane | 3-Mercaptopropyl-triethoxysilane | 1:1 | 90 | 42 |

From results of Table 1, it was confirmed that when the solid electrolyte layer included only one silicon-containing component (Comparative Examples 1 to 3), the LC nondefective rate and the withstand voltage were low, while the LC nondefective rate and the withstand voltage were high in Examples 1 to 3. It was also confirmed that in Comparative Example 4 in which the first functional group and the second functional group were the same, the LC nondefective rate and the withstand voltage were low as in the case in which the solid electrolyte layer included only one silicon-containing component.

TABLE 2

|  | First silane coupling agent | Second silane coupling agent | C1':C2' | LC non-Defective rate (%) | BDV (V) |
| --- | --- | --- | --- | --- | --- |
| Example 4 | 3-Glycidoxypropyl-trimethoxysilane | 3-Mercaptopropyl-trimethoxysilane | 8:1 | 98 | 54 |
| Example 5 | 3-Glycidoxypropyl-trimethoxysilane | 2-(3,4-Epoxycyclohexyl)ethyltrimethoxysilane | 8:1 | 95 | 52 |
| Example 6 | 3-Glycidoxypropyl-trimethoxysilane | 3-Mercaptopropyl-trimethoxysilane | 2:1 | 98 | 60 |
| Example 7 | 3-Glycidoxypropyl-trimethoxysilane | 2-(3,4-Epoxycyclohexyl)ethyltrimethoxysilane | 2:1 | 95 | 56 |
| Comparative Example 6 | 3-Glycidoxypropyl-trimethoxysilane | — | — | 60 | 40 |
| Comparative Example 7 | 3-Glycidoxypropyl-trimethoxysilane | 3-Glycidoxypropyl-triethoxysilane | 1:1 | 65 | 42 |
| Comparative Example 8 | 3-Mercaptopropyl-triethoxysilane | — | — | 85 | 45 |
| Comparative Example 9 | 3-Mercaptopropyl-trimethoxysilane | 3-Mercaptopropyl-triethoxysilane | 1:1 | 90 | 47 |

TABLE 2-continued

|  | First silane coupling agent | Second silane coupling agent | C1':C2' | LC non-Defective rate (%) | BDV (V) |
|---|---|---|---|---|---|
| Comparative Example 10 | 2-(3,4-Epoxy-cyclohexyl)ethyltrimethoxysilane | — | — | 4 | 30 |

From results of Table 2, it was confirmed that when the solid electrolyte layer included only one silicon-containing component (Comparative Examples 6, 8, and 10), the LC nondefective rate and the withstand voltage were low, while the LC nondefective rate and the withstand voltage were high in Examples 4 to 7. It was also confirmed that in Comparative Examples 7 and 9 in which the first functional group and the second functional group were the same, the LC nondefective rate and the withstand voltage were low.

The exemplary embodiment disclosed this time is an example in all respects and should not be considered to be restrictive. Scope of the present invention is indicated by scope of claims rather than the above description, and the scope of the present invention is intended to include meaning equivalent to the scope of claims and all modifications within the scope of claims.

INDUSTRIAL APPLICABILITY

The present invention can be widely used to suppress leakage current of a solid electrolytic capacitor.

The invention claimed is:

1. A method for producing a solid electrolytic capacitor, the method comprising:
    a first step of preparing an anode body on which a dielectric layer is formed;
    a second step of forming a first solid electrolyte layer that covers at least a part of the dielectric layer by a first treatment solution containing a conductive polymer or a raw material of a conductive polymer, and a first silane coupling agent; and
    a third step of forming a second solid electrolyte layer that covers at least a part of the first solid electrolyte layer by a second treatment solution containing a conductive polymer or a raw material of a conductive polymer, and a second silane coupling agent,
    wherein the first silane coupling agent including a first substituent that has a first functional group and is bonded with a silicon atom, and a hydrolytically condensable group, the first functional group including at least one selected from the group consisting of an epoxy group, an acrylic group, a methacrylic group and a vinyl group,
    the second silane coupling agent including a second substituent that has a second functional group and is bonded with a silicon atom, and a hydrolytically condensable group, the second functional group including at least one selected from the group consisting of an amino group and a mercapto group.

2. The method for producing a solid electrolytic capacitor according to claim 1, wherein
    a concentration of the first silane coupling agent in the first treatment solution is higher than a concentration of the second silane coupling agent in the second treatment solution.

3. A solid electrolytic capacitor comprising:
    an anode body;
    a dielectric layer formed on the anode body; and
    a solid electrolyte layer that covers at least a part of the dielectric layer and includes a conductive polymer,
    the solid electrolyte layer including a first silicon-containing component and a second silicon-containing component,
    the first silicon-containing component being at least one selected from the group consisting of a first silane coupling agent and residues of the first silane coupling agent,
    the second silicon-containing component being at least one selected from the group consisting of a second silane coupling agent and residues of the second silane coupling agent,
    wherein the first silane coupling agent includes:
    a first substituent that has a first functional group including at least one selected from the group consisting of an epoxy group, an acrylic group, a methacrylic group and a vinyl group and is bonded with a silicon atom; and
    a hydrolytically condensable group, and
    wherein the second silane coupling agent includes:
    a second substituent that has a second functional group including at least one selected from an amino group and a mercapto group and is bonded with a silicon atom; and
    a hydrolytically condensable group.

4. The solid electrolytic capacitor according to claim 3, wherein
    the first substituent has the first functional group and a first organic linking group that links the first functional group to a silicon atom of the first silane coupling agent, and
    the second substituent has the second functional group and a second organic linking group that links the second functional group to a silicon atom of the second coupling agent.

5. The solid electrolytic capacitor according to claim 3, wherein a concentration of the first silicon-containing component is higher than a concentration of the second silicon-containing component in the solid electrolyte layer.

* * * * *